(12) United States Patent
Millar et al.

(10) Patent No.: US 7,636,104 B2
(45) Date of Patent: Dec. 22, 2009

(54) VIDEO SURVEILLANCE SYSTEM

(75) Inventors: Greg Max Millar, Coarsegold, CA (US); Ray Still, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 535 days.

(21) Appl. No.: 11/144,399

(22) Filed: Jun. 3, 2005

(65) Prior Publication Data

US 2006/0274148 A1    Dec. 7, 2006

(51) Int. Cl.
*H04N 7/18* (2006.01)
(52) U.S. Cl. ................. 348/143; 348/153; 348/159
(58) Field of Classification Search .......... 348/142–161
See application file for complete search history.

(56) References Cited

U.S. PATENT DOCUMENTS

| | | | |
|---|---|---|---|
| 6,094,221 A | 7/2000 | Andersion | |
| 6,424,370 B1 * | 7/2002 | Courtney | 348/143 |
| 6,931,633 B1 * | 8/2005 | Vazquez et al. | 717/131 |
| 7,174,361 B1 * | 2/2007 | Paas | 709/203 |

* cited by examiner

*Primary Examiner*—Andy S Rao
(74) *Attorney, Agent, or Firm*—Paul T. Kashimba, Esq.

(57) ABSTRACT

A method and system of controlling a video surveillance system comprising providing a distributed video surveillance system having a plurality of devices, building a script having a parameter that is filled in when an event occurs, storing the script, detecting the occurrence of an event, loading data related to a first device from the plurality of devices in a first parameter to generate a first script, the first device being associated with the detection of the occurrence of an event, and executing the first script.

16 Claims, 9 Drawing Sheets

```
SCRIPT = TEMPLATE

EVENT = _____

FIND ASSOCIATED CAMERA

CAMERA = _____

INSTRUCTION = TURN CAMERA _____ TO (XY)
```

Fig. 3

VIDEO SURVEILLANCE SYSTEM

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates generally to video surveillance systems and in particular to a method and system of controlling a video surveillance system.

The prior art surveillance systems in which everything is hardwired and preset have not provided flexibility and ease of setup. Such systems require that during setup all possible events and the surveillance system's responses to those events be determined before the system is hardwired. After the system has been installed, few changes can be made to the system without substantial expenses and labor. The setup in a networked video surveillance system containing a large number of video surveillance cameras, event detectors, and video recorders has also been a formidable task requiring tedious setup to provide for all of the possible variations required to have the appropriate devices respond to a detected event such as an alarm. Even when the personnel responsible for the setup have been able to envision every possible parameter to be addressed, equipment changes or equipment problems making the desired device unavailable for a particular circumstance have created even further difficulties in creating a video surveillance system that meets the high standards required for today's systems. Accordingly, there has been a long felt need for a video surveillance system that facilitates setup and adapts to varying devices and the changing availability of the system resources.

SUMMARY OF THE INVENTION

In accordance with the present invention there is provided a method of controlling a video surveillance system comprising the steps of providing a distributed video surveillance system having a plurality of devices, building a script having a parameter that is filled in when an event occurs, storing the script, detecting the occurrence of an event, loading data related to a first device from the plurality of devices in a first parameter to generate a first script, the first device being associated with the detection of the occurrence of an event, and executing the first script.

The present invention also provide a video surveillance system comprising a network, a plurality of video surveillance cameras, to the network, and an event detector and a script manager connected to the network. The script manager has a memory in which a template script is stored. The template script has a parameter pertaining to a video surveillance camera from the plurality of video surveillance cameras which is not filled. The script manager is adapted to fill in the parameter with data from a video surveillance camera from the plurality of video surveillance cameras that is associated with an event that is detected by the event detector to create a completed script and to cause the completed script to be executed.

The method and system of the present invention provide a video surveillance system in which a template script is created in which one or more of the parameters get filled in later rather than at the time of the creation of the script. The parameters, that are not filled in, get completed when an event occurs, thereby creating a specific script related to the detected event. In essence, the script manager builds scripts on the fly from a template script rather than at the time of setup, which requires a creation of a specific script for each possible event. Instead of writing one hundred scripts in a one hundred camera system, only a template script is required. When an event is detected, the script manager selects the appropriate device based on a system protocol. For example in one protocol, at setup, the physical locations of the video surveillance cameras and event detectors are loaded into the memory of the script manager. Then when an event is detected, the script manager chooses a video surveillance camera with coordinates that would allow it to have the area of interest in its field of view. The script manager can execute the script and control the video surveillance camera remotely. Alternatively, the script manager can upload the script on the network, and the selected video surveillance camera can run the script.

The method and system of the present invention also provides a system that adapts to the current state of the system. In one embodiment, the state of the system devices is detected either on a periodic basis or at the time of an event. If the selected device is not on-line, then the next best device is chosen. In another embodiment, the data for the selected device, such as a video surveillance camera, is filled into the parameter in the template script and uploaded to the device. The device then runs the script locally and fills in appropriate parameters for other devices in the script, such as the video recorder normally used by the selected camera.

Other advantages and applications of the present invention will be made apparent by the following detailed description of the preferred embodiment of the invention.

BRIEF DESCRIPTION OF THE SEVERAL VIEWS OF THE DRAWINGS

FIG. 3 is a diagrammatic view of a template script of one embodiment of the present invention.

DETAILED DESCRIPTION OF THE INVENTION

Figure 1:
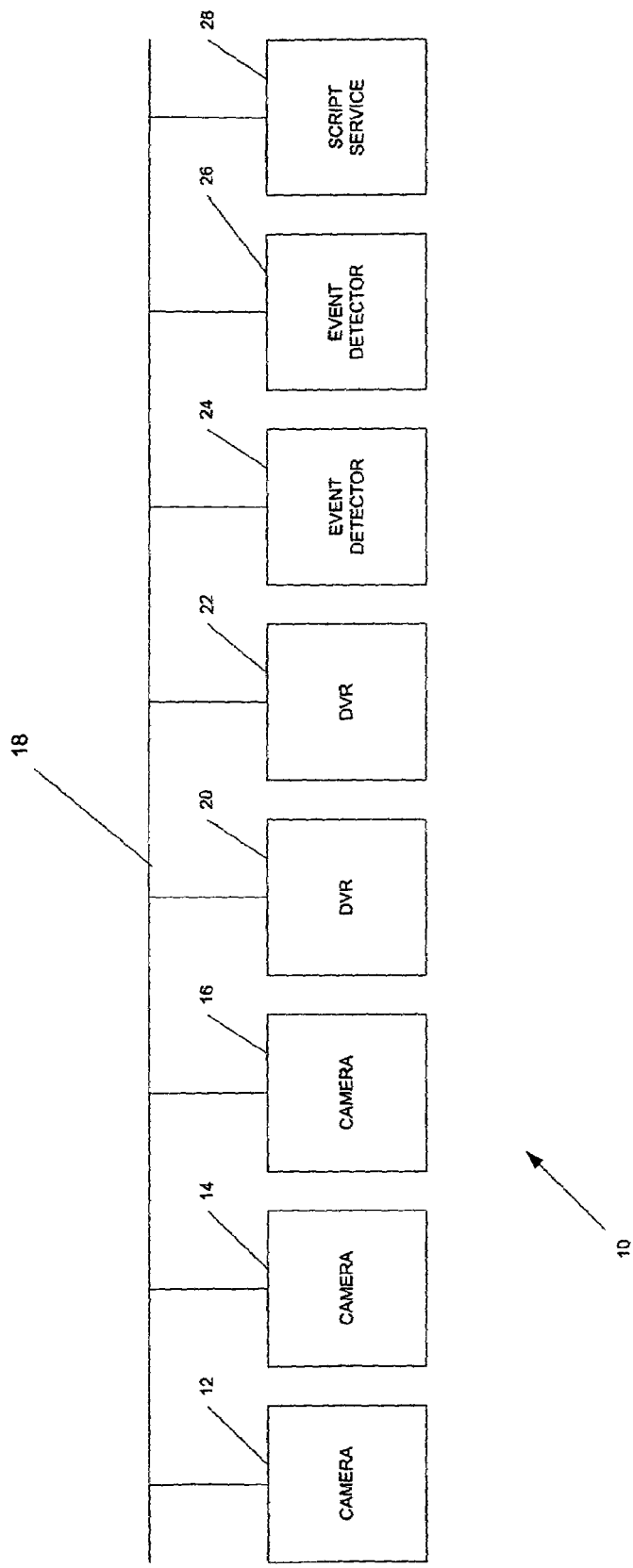
FIG. 1 is a block diagram of a video surveillance system utilizing the present invention.

FIG. 1 shows a video surveillance system 10 utilizing the present invention. Video surveillance system 10 has a plurality of video cameras 12, 14, and 16 connected to network 18, which can be a closed network, local area network, or wide area network, such as the Internet. Video cameras 12, 14, and 16 can be digital cameras or analog cameras with analog to digital converters so that they provide digital video data to network 18. Digital video recorders 20 and 22 are also connected to network 18 to record the video data provided by video cameras 12, 14, and 16. The video data from video cameras 12, 14, and 16 can be compressed data streams, such as JPEG or MPEG type compressed data streams. Event detectors 24 and 26 detect events, such as alarms that occur in locations monitored by video surveillance system 10 or events related in some way to the locations monitored by video surveillance system 10. Event detectors 24 and 26 are connected to network 18 to provide notices of any events that are detected. Script service 28 is connected to network 18 to provide scripts that are executed in response to a detected event. The scripts are uploaded via network 18 to the appropriate device on network 18, such as any of video cameras 12, 14, and 16 or digital video recorders 20 and 22. Script service 28 can be a stand-alone device having a processing unit and storage, such as a personal computer, or it can be incorporated into one of the other devices attached to network 18. When either of event detectors 24 and 26 detects an event, they provide a message to script service 28 via network 18. Based on the event detected, script service 28 fills in a template script and sends the script over network 18 to the appropriate device as discussed hereinbelow in detail.

Figure 2:
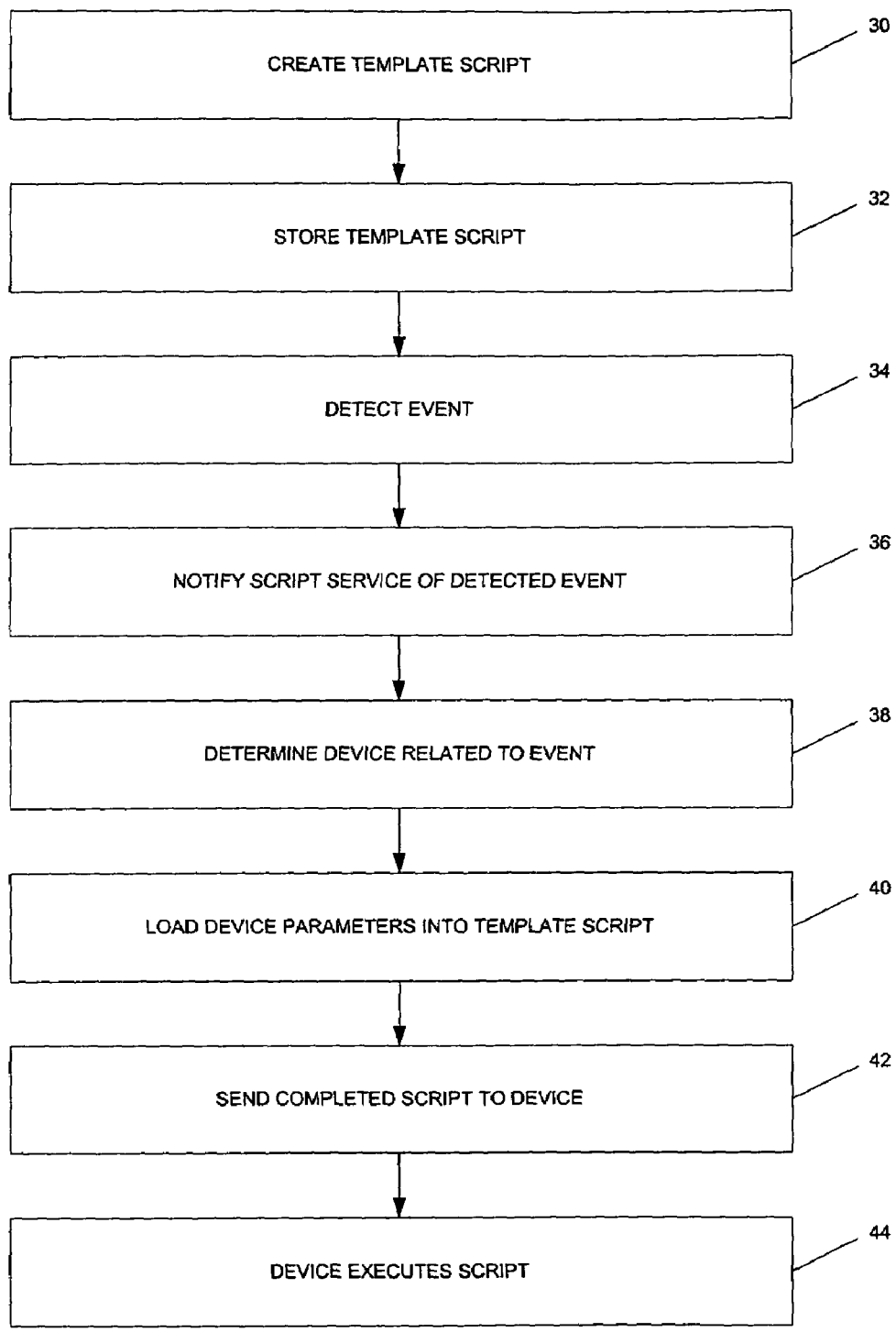
FIG. 2 is a flowchart for one embodiment of the present invention.

FIG. 2 illustrates the logical steps utilized in implementing one embodiment of the present invention. At step 30 a template script is created. A script as used herein is a list of one or more commands that are executed without user interaction. A template script is one in which one or more of the devices that are to execute one or more commands in response to the detected event are not defined. They are a variable that is filled in at the time of the detected event with the appropriate device or devices. The template script is stored in memory, such as a hard disc drive or random access memory at step 32. At step 34 an event is detected by event detector 24 or 26, such as an alarm triggered by the unauthorized opening of a door. Event detector 24 or 26 then notifies script service 28 of the detected event by sending an appropriate message over network 18 at step 36. Script service 28 then at step 38 determines the appropriate device related to the detected event. This can be done in a number of ways, for example, if an event detector #1 detects an event, then script service 28 consults a list stored in memory to determine the camera associated with the detected event. Another manner in which the appropriate device is determined is by utilizing a site map for each of the locations monitored by video surveillance system 10. With a site map, the devices in the system have coordinates indicative of their physical locations. In this case the (x,y) coordinates of the detected event are utilized to determine the appropriate device to implement the commands. The device parameter filled in the template script is based on its (x,y) coordinates. At step 40 the appropriate device data is then loaded into the template script to create a specific script for responding to the detected event. This specific script is then sent to the selected appropriate device in step 42 in video surveillance system 10. The selected appropriate device then executes the specific script at step 44.

Figure 4:
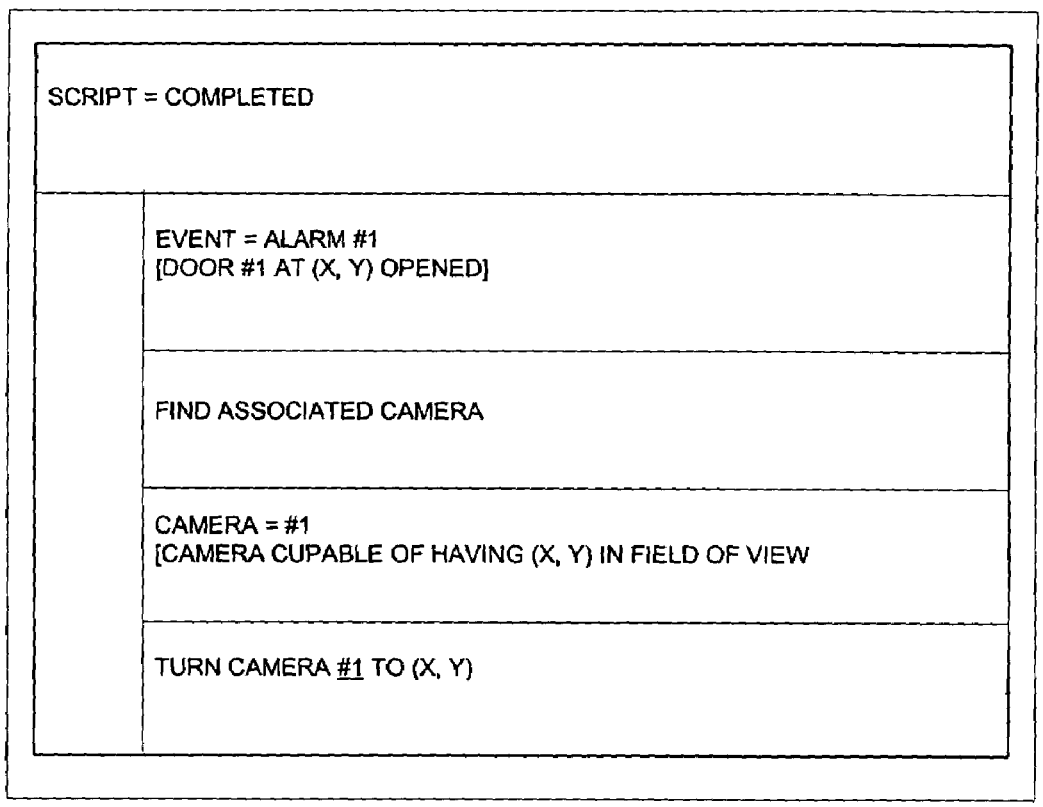
FIG. 4 is a diagrammatic view of a completed script for the template script shown in FIG. 3.
Figure 5:
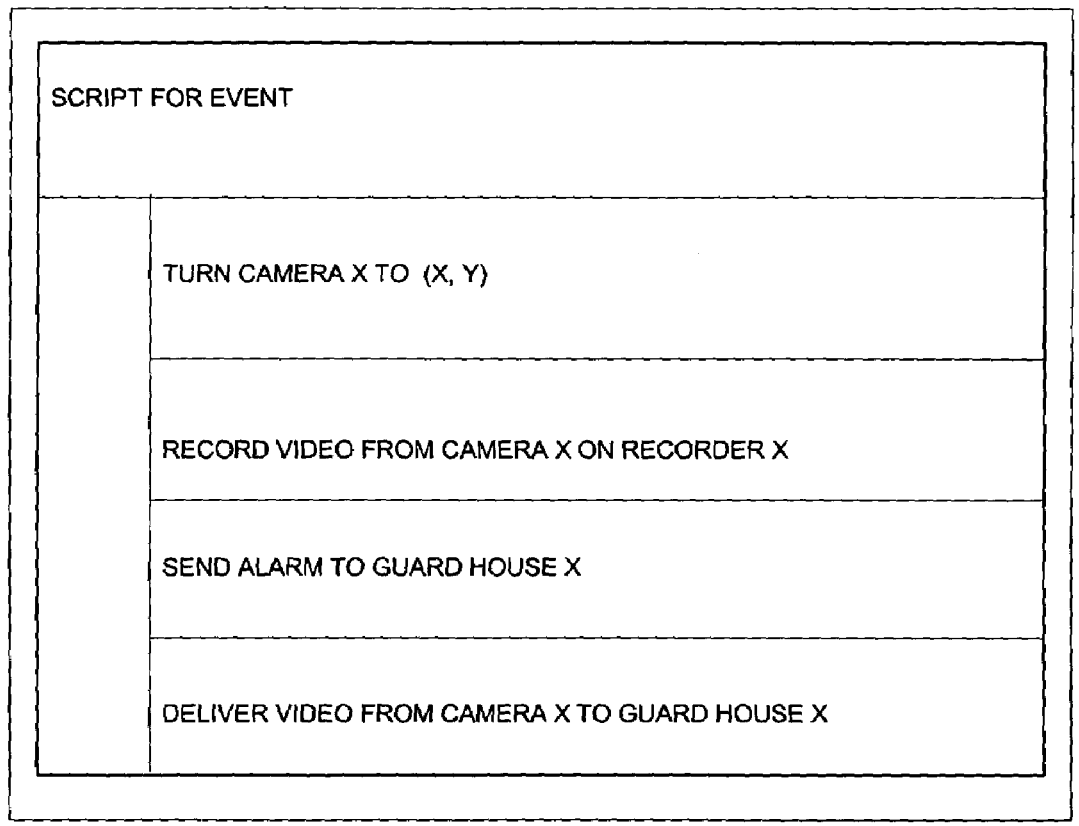
FIG. 5 is a diagrammatic view of a template script of one embodiment of the present invention.

A simple example of a template script is illustrated in FIG. 3. In this example, the event parameter and camera parameter get filled in when an event occurs. The instruction that is provided to the selected camera is turn to the coordinate (x,y). FIG. 4 shows the script of FIG. 3 completed when an event referenced as Alarm #1 occurs. Alarm #1 could be, for example, the opening of Door #1 which is located at coordinate (x,y). Script manager 28 of FIG. 1 searches its database to determine which camera is associated with Alarm #1. In the example shown, Camera #1 is the camera associated with Alarm #1 because it is capable of having Door #1, which is located at coordinate (x,y) in its field of view. The script provided to Camera #1 is the instruction turn to coordinate (x,y). This example utilizes a coordinate map for the locations monitored by video surveillance system 10 so that the camera is provided with the appropriate coordinates to place the door in its field of view. The script could also use an instruction such as turn to Preset #1, which would have been programmed into Camera #1 at setup to be the door monitored by Alarm #1. This procedure would require a protocol that the presets of the cameras in the system be programmed in a regimented way. FIG. 5 illustrates in summary form another template script for an event entitled Event X. In this case a Camera X1 is turned to location (x,y), the video provided by Camera X1 is recorded on Recorder X2, an alarm is sent to Guard House X3, and video from Camera X1 is delivered to Guard House X3. The parameters for Camera X1, Recorder X2 and Guard House X3 are filled in at the time of Event X.

Figure 6:
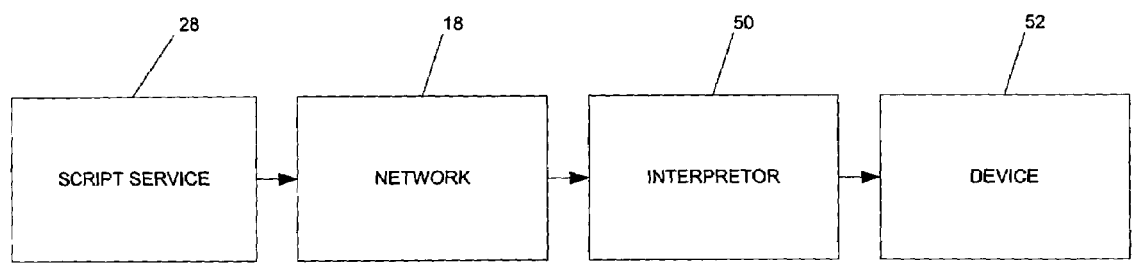
FIG. 6 is a block diagram of one embodiment of the present invention.

Referring to FIG. 6, script service 28 provides a script encoded in Simple Object Access Protocol (SOAP) to network 18. The script can be written for example, in an object-oriented programming language such as the Python or Java languages. The SOAP encapsulated script is received from network 18 by interpreter 50 which is a program stored either in device 52 or in suitable storage associated with device 52. Interpreter 50 converts the high-level language instructions of the script into a format that can be executed by device 52, which can be, for example, any of cameras 12, 14, and 16 and digital video recorders 20 and 22 or other suitable device.

Figure 7:
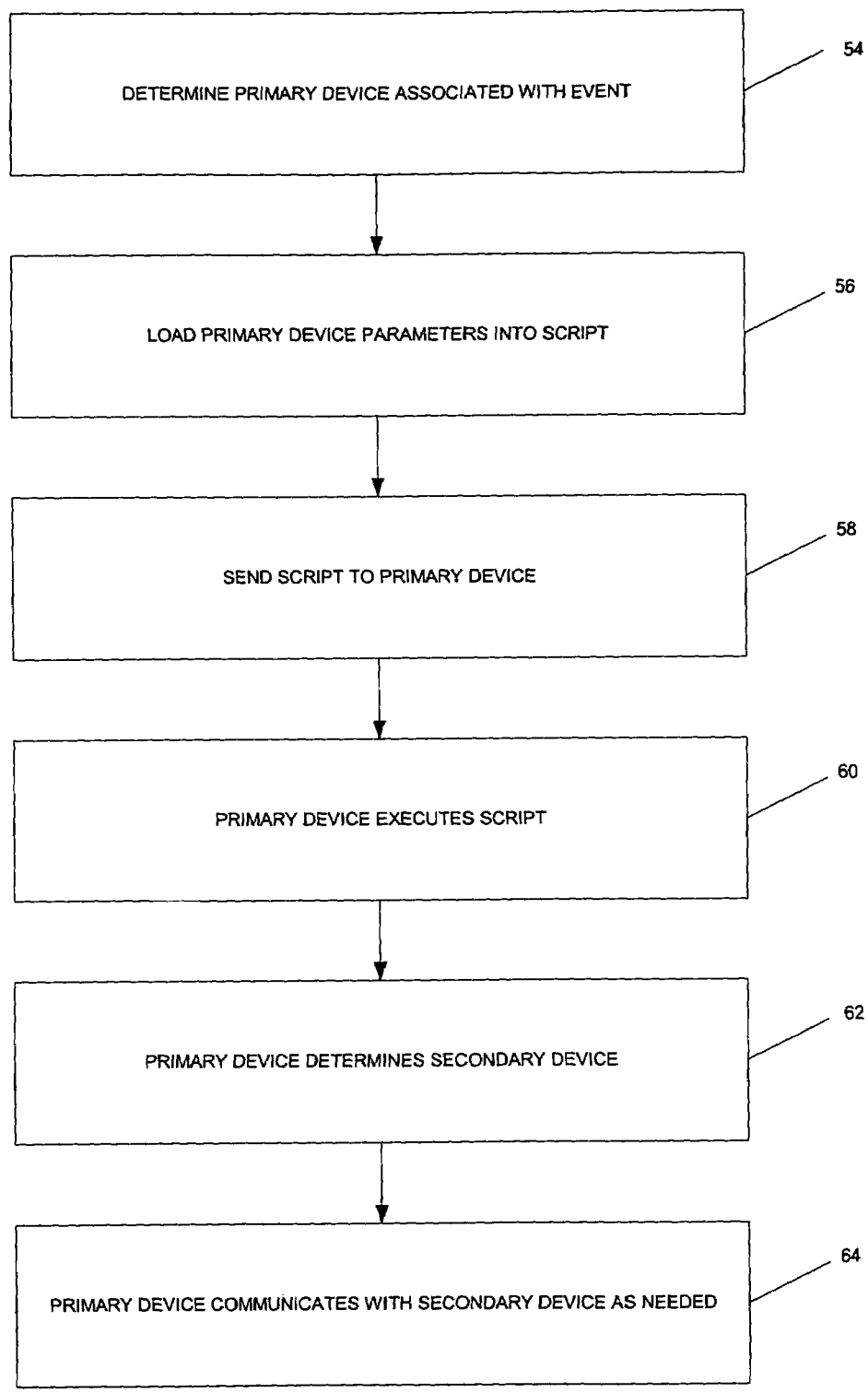
FIG. 7 is a flowchart for one embodiment of the present invention.
Figure 8:
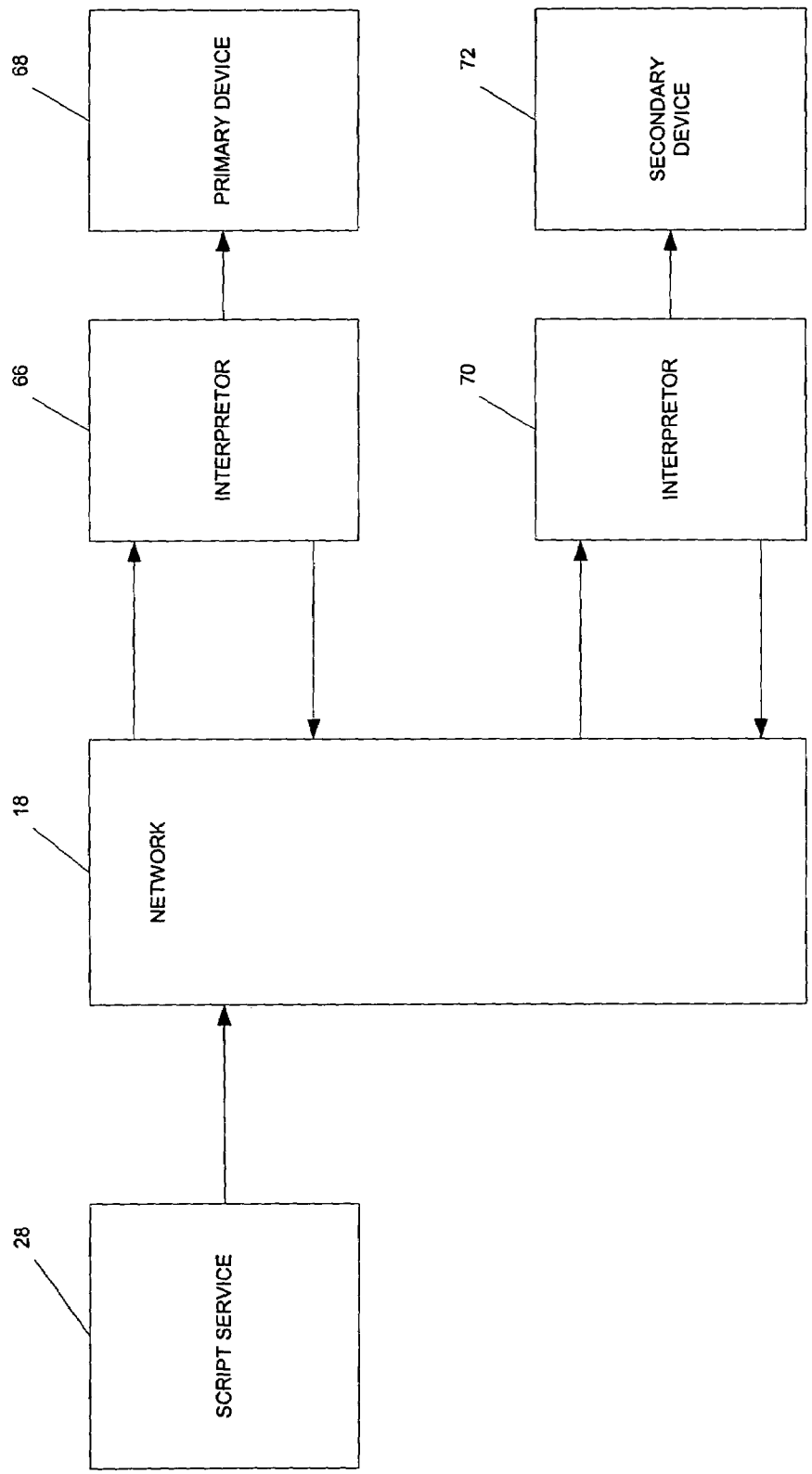
FIG. 8 is a block diagram of one embodiment of the present invention.

In an alternative embodiment of the present invention shown in FIG. 7, at step 54 script manager 28 determines the primary device associated with the event. Script manager 28 then loads the parameters into the template script for the primary device at step 56. The script is then sent via network 18 to the primary device in step 58. The primary device then executes the script in step 60 and determines a secondary device needed to execute the script in step 62. For example, if the primary device is a video camera, then the script may contain an instruction to the video camera to record the captured video on the digital video recorder that is normally associated with the video camera. As indicated at step 64, the primary device then communicates with the secondary device as needed. This communication could include messages back and forth between the primary and secondary devices without involving script manager 28. FIG. 8 illustrates this embodiment in block diagram form. Interpreter 66 is connected to network 18 and primary device 68. Interpreter 70 is connected to network 18 and secondary device 72. Interpreters 66 and 70 are shown as separate logical boxes in FIG. 8; however, as discussed above, interpreters 66 and 70 can be loaded into their respective devices. Interpreter 66 acts as a control point in that it interprets the script instructions and, as needed, forms SOAP messages to send to other devices, which provide other services. Interpreter 66 also must handle return messages, including error messages, from interpreter 70 concerning secondary device 72.

Figure 9:
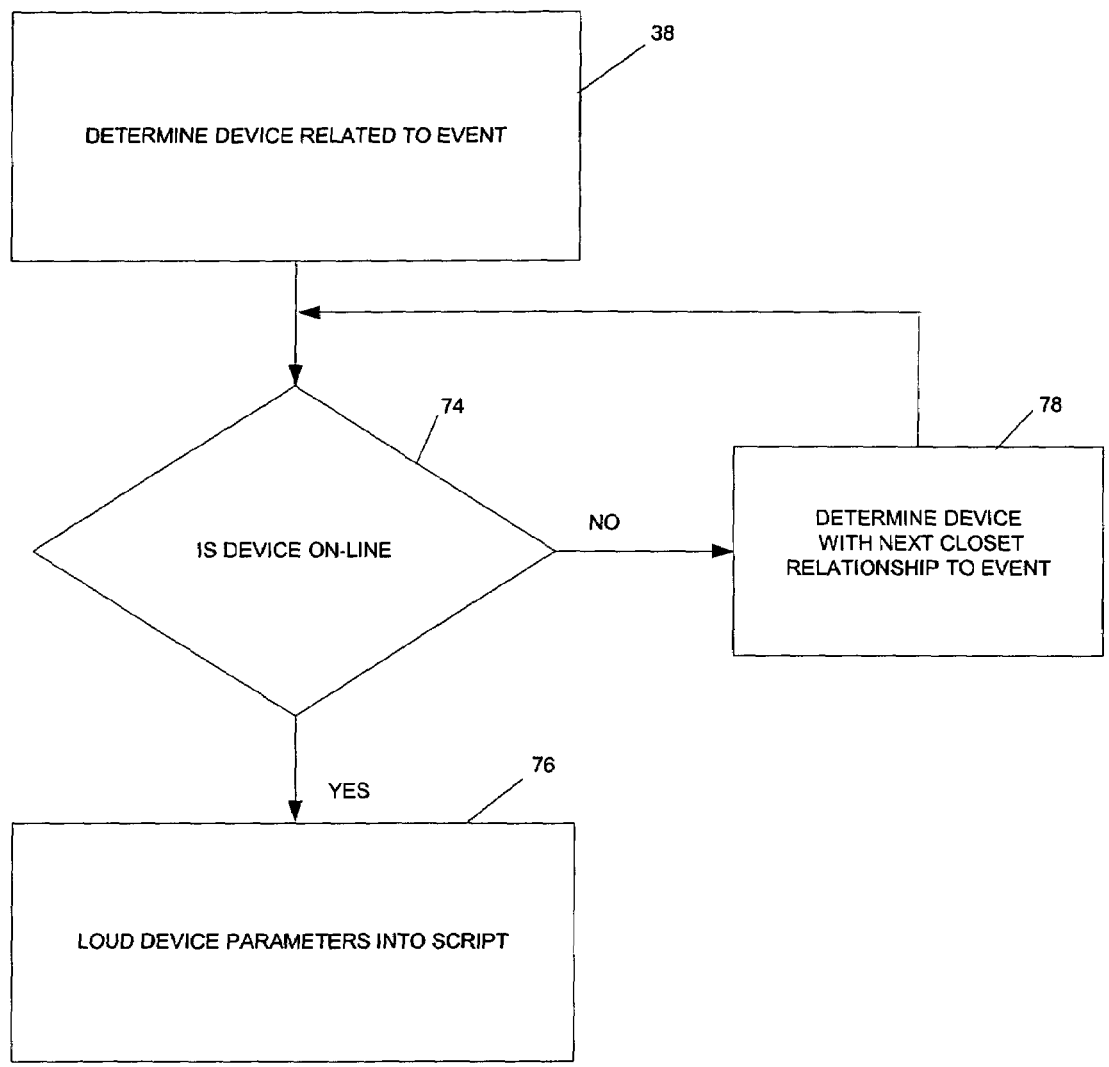
FIG. 9 is a flowchart for one embodiment of the present invention.

FIG. 9 illustrates an alternative embodiment of the present invention. In this embodiment after step 38 of the flowchart shown in FIG. 2, in which the device related to the event is determined, script manager 28 then determines at decision point 74 whether the identified device is on-line, i.e., the state of the variable. If the device is on-line, then at block 76 the parameters for that device are filled into the script. If the device is not on-line, then at block 78 script manager 28 determines the device with the next closest relationship to the event. This device is then checked at decision point 74 to determine if it is on-line. The process is repeated until a device that is on-line is identified.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of controlling a distributed video surveillance system having a plurality of devices connected to a network comprising the steps of: establishing a protocol for associating the plurality of devices with the occurrence of an event; storing the protocol; building a template script that contains a command for an undefined device from the plurality of devices to execute; storing the template script; detecting an occurrence of an event; selecting a device from the plurality of devices according to the protocol to be a device associated with the detected event; loading data related to the selected device in the template script to generate in real time a first executable script specifically related to the detected event; and executing the first script automatically without user interaction.

2. A method as recited in claim 1 wherein said step of establishing a protocol comprises selecting a device from the plurality of devices spatially related to the detection of the occurrence of an event.

3. A method as recited in claim 2 wherein said step of establishing a protocol further comprises the step of loading information into the video surveillance system pertaining to the physical location of the plurality of devices in the video surveillance system.

4. A method as recited in claim 3 wherein said step of selecting a device comprises selecting a camera that can view an area physically related to the detected event.

5. A method as recited in claim 1 further comprising the steps of detecting the state of the selected device to determine if the selected device is on-line and loading data related to a second device if the selected device is not on-line.

6. A method as recited in claim 1 wherein said step of executing the first script comprises running the first script at a location remote from the selected device.

7. A method as recited in claim 1 further comprising the step of sending the first script to the selected device and wherein said step of executing the first script comprises having the selected device execute the first script.

8. A method as recited in claim 7 wherein the first script has a variable that is dependent on the selected device and is not filled in before sending the first script to the selected device and further comprising the step of having the selected device fill in the variable to adapt the first script.

9. A video surveillance system comprising: a network; a plurality of video surveillance devices connected to said network; an event detector connected to said network; a script manager connected to said network, said script manager having a memory, a template script stored in said memory, and a protocol stored in said memory, said template script containing a command for an undefined device from said plurality of video surveillance devices to execute, said protocol associating said plurality of video surveillance devices with an occurrence of an event, said script manager being adapted to select a video surveillance device from said plurality of video surveillance devices according to said protocol to be a device associated with an event detected by said event detector and loading data associated with the selected video surveillance device in said template script to create in real time a completed executable script specifically related to a detected event and to cause the completed script to be executed without user interaction in response to a detected event.

10. A video surveillance system as recited in claim 9 wherein said plurality of video surveillance devices comprise video surveillance cameras and wherein said protocol causes said script manager to select a video surveillance camera that is spatially related to said event detector.

11. A video surveillance system as recited in claim 10 wherein said protocol contains the physical locations of said plurality of video surveillance cameras and said event detector stored in said memory.

12. A video surveillance system as recited in claim 9 wherein said script manager determines whether a video surveillance device is on-line before its data is loaded in said template script and selects another video surveillance device if the selected video surveillance device is not on-line.

13. A video surveillance system as recited in claim 9 wherein said script manager executes said completed script and controls the video surveillance device whose data was loaded into said template script.

14. A video surveillance system as recited in claim 9 wherein said script manager sends said completed script to the video surveillance device whose data was loaded into said template script and said video surveillance device whose data was loaded into said template script executes said completed script.

15. A video surveillance system as recited in claim 14 wherein template script has a variable that is not filled in and said video surveillance device whose data was loaded into said template script fills in said variable before executing said completed script.

16. A video surveillance system as recited in claim 15 wherein said video surveillance device whose data was loaded into said template script comprises a video surveillance camera and wherein said plurality of video surveillance devices comprises a video recorder and said video surveillance camera whose data was loaded into said template script fills in said variable with data pertaining to said video recorder.

* * * * *